United States Patent
Shemesh

(10) Patent No.: US 10,270,792 B1
(45) Date of Patent: Apr. 23, 2019

(54) METHODS FOR DETECTING MALICIOUS SMART BOTS TO IMPROVE NETWORK SECURITY AND DEVICES THEREOF

(71) Applicant: F5 Networks, Inc., Seattle, WA (US)

(72) Inventor: Yaniv Shemesh, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 107 days.

(21) Appl. No.: 15/404,852

(22) Filed: Jan. 12, 2017

Related U.S. Application Data

(60) Provisional application No. 62/281,538, filed on Jan. 21, 2016.

(51) Int. Cl.
 *H04L 29/06* (2006.01)
(52) U.S. Cl.
 CPC ...... *H04L 63/1425* (2013.01); *H04L 63/0428* (2013.01); *H04L 63/10* (2013.01)
(58) Field of Classification Search
 CPC .. H04L 63/1425; H04L 63/0428; H04L 63/10
 See application file for complete search history.

(56) References Cited

U.S. PATENT DOCUMENTS

| | | | |
|---|---|---|---|
| 6,748,056 B1 | 6/2004 | Capriotti et al. | |
| 7,228,412 B2 | 6/2007 | Freed | |
| 7,519,834 B1 | 4/2009 | Dondeti et al. | |
| 9,077,709 B1 | 7/2015 | Dall | |
| 9,578,055 B1 | 2/2017 | Khanal | |
| 9,628,499 B1 | 4/2017 | Yu et al. | |
| 9,654,485 B1 | 5/2017 | Neumann | |
| 9,705,902 B1 * | 7/2017 | Call | H04L 63/1416 |
| 9,800,602 B2 * | 10/2017 | Shekyan | H04L 63/1433 |
| 2002/0116615 A1 | 8/2002 | Nguyen et al. | |
| 2004/0103283 A1 | 5/2004 | Hornak | |
| 2005/0027846 A1 | 2/2005 | Wolfe et al. | |
| 2008/0263215 A1 | 10/2008 | Schnellbaecher | |

(Continued)

OTHER PUBLICATIONS

Tegeler et al., "BotFinder: Finding Bots in Network Traffic Without Deep Packet Inspection", Dec. 2012, ACM, pp. 349-360. (Year: 2012).*

(Continued)

*Primary Examiner* — Matthew Smithers
(74) *Attorney, Agent, or Firm* — Pepper Hamilton LLP

(57) ABSTRACT

Methods, non-transitory computer readable media, security management apparatuses, and network traffic management systems that send a web page to a client device in response to a received request for a web resource. The web page comprises injected capability analysis client-side code that is configured to obtain and return capability data for a web browser identified in a user agent header of the request. A response comprising the returned capability data is received and the returned capability data is compared with expected capability data for the web browser identified in the user agent header of the request. A score is generated based at least in part on the comparison and a determination is made when the score exceeds an established threshold. The web resource is retrieved and provided to the client device, when the determining indicates that the score exceeds the established threshold.

20 Claims, 5 Drawing Sheets
(1 of 5 Drawing Sheet(s) Filed in Color)

(56) References Cited

U.S. PATENT DOCUMENTS

| | | | |
|---|---|---|---|
| 2009/0241174 A1* | 9/2009 | Rajan | G06F 21/31 |
| | | | 726/5 |
| 2010/0070620 A1* | 3/2010 | Awadallah | G06F 11/3485 |
| | | | 709/224 |
| 2010/0325418 A1 | 12/2010 | Kanekar | |
| 2011/0154026 A1 | 6/2011 | Edstrom | |
| 2011/0264905 A1 | 10/2011 | Ovsiannikov | |
| 2012/0090030 A1* | 4/2012 | Rapaport | H04L 63/1441 |
| | | | 726/23 |
| 2012/0323700 A1 | 12/2012 | Aleksandrovich et al. | |
| 2014/0095865 A1 | 4/2014 | Yerra | |
| 2014/0298419 A1 | 10/2014 | Boubez | |
| 2015/0067328 A1 | 3/2015 | Yin | |
| 2015/0128236 A1* | 5/2015 | Moscicki | H04L 63/0876 |
| | | | 726/7 |
| 2015/0271179 A1 | 9/2015 | Wang et al. | |
| 2016/0080345 A1* | 3/2016 | Safruti | H04L 67/02 |
| | | | 726/6 |
| 2017/0063923 A1* | 3/2017 | Yang | H04L 63/1483 |

OTHER PUBLICATIONS

Zhang et. al., "Boosting the Scalability of Botnet Detection Using Adaptive Traffic Sampling", Mar. 2011, ACM, pp. 124-134. (Year: 2011).*

BIG-IP® Analytics: Implementations, version 11.3, Nov. 15, 2012, F5 Networks, Inc., pp. 1-40.

F5 Networks, "BIG-IP Local Traffic Manager: Concepts", version 11.4, pp. 1-178, retrieved from https://support.f5.com/kb/en-us/products/big-ip_ltm/manuals/product/ltm-concepts-11-4-0.html on Feb. 12, 2015.

F5 Networks, "BIG-IP Local Traffic Manager: Implementations", version 11.4, pp. 1-234, retrieved from https://support.f5.com/kb/en-us/products/big-ip_ltm/manuals/product/ltm-implementations-11-4-0.html on Feb. 12, 2015.

F5 Networks, "BIG-IP Local Traffic Manager: Monitors Reference", version 11.4, pp. 1-106, retrieved from https://support.f5.com/kb/en-us/products/big-ip_ltm/manuals/product/ltm-monitors-reference-11-4-0.html on Feb. 12, 2015.

F5 Networks, "Operations Guide 1.0 F5 Local Traffic Manager and Global Traffic Manager", pp. 1.144, retrieved from https://support.f5.com/kb/en-us/products/big-ip_ltm/manuals/product/f5-ltm-gtm-operations-guide-1-0.html on Feb. 12, 2015.

F5 Networks, "Release Note: BIG-IP LTM and TMOS", version 11.4.1, pp. 1-58, retrieved from https://support.f5.com/kb/en-us/products/big-ip_ltm/releasenotes/product/relnote-ltm-11-4-1.html on Feb. 12, 2015.

F5 Networks, Inc., "BIG-IP Application Security Manager Operations Guide", Manual, Feb. 5, 2016, pp. 1-181, F5 Networks, Inc.

F5 Networks, Inc., "BIG-IP ASM 11.5.0", Release Notes, Apr. 12, 2016, Version 11.5.0.

F5 Networks, Inc., "BIG-IP ASM", Release Notes, Jun. 13, 2016, pp. 1-18, version 11.6.1 F5 Networks, Inc.

F5 Networks, Inc., "BIG-IP® Analytics: Implementations", Manual, Jan. 31, 2014, pp. 1-50, Version 11.5.

F5 Networks, Inc., "BIG-IP® Analytics: Implementations", Manual, Aug. 25, 2014, pp. 1-62, v11.6, F5 Networks, Inc.

F5 Networks, Inc., "BIG-IP® Application Security Manager™: Getting Started", Manual, Aug. 25, 2014, pp. 1-78, version 11.6, F5 Networks, Inc.

F5 Networks, Inc., "BIG-IP® Application Security Manager™: Implementations", Manual, Aug. 25, 2014, pp. 1-420, version 11.6, F5 Networks, Inc.

F5 Networks, Inc., "BIG-IP® Application Security Manager™: Implementations", Manual, Jan. 31, 2014, pp. 1-396, Version 11.5.

F5 Networks, Inc., "BIG-IP® Application Security Manager™: Implementations", F5 Networks, Inc., Dec. 10, 2014, version 11.6, pp. 1-420.

F5 Networks, Inc., "BIG-IP® Local Traffic Management: Basics", Manual, Aug. 25, 2014, pp. 1-74, version 11.6, F5 Networks, Inc.

F5 Networks, Inc., "BIG-IP® Network Firewall: Policies and Implementations", Manual, Aug. 10, 2016, pp. 1-166, v11.6, F5 Networks, Inc.

F5 Networks, Inc., "BIG-IP® Systems: DoS Protection and Protocol Firewall Implementations", Manual, Aug. 25, 2014, pp. 1-108, v11.6, F5 Networks, Inc.

F5 Networks, Inc., "BIG-IP® TMOS®: Concepts", Manual, Nov. 11, 2014, pp. 1-148, Version 11.5.

F5 Networks, Inc., "BIG-IP® TMOS®: Implementations", Manual, Jan. 31, 2014, pp. 1-274, Version 11.5.

F5 Networks, Inc., "F5 BIG-IP TMOS: Operations Guide", Manual, Mar. 5, 2015, pp. 1-276 version 11.6, F5 Networks, Inc.

\* cited by examiner

US 10,270,792 B1

METHODS FOR DETECTING MALICIOUS SMART BOTS TO IMPROVE NETWORK SECURITY AND DEVICES THEREOF

This application claims the benefit of U.S. Provisional Patent Application Ser. No. 62/281,538, filed on Jan. 21, 2016, which is hereby incorporated by reference in its entirety.

FIELD

This technology generally relates to network security and, more particularly, to methods and devices for detecting malicious smart bots to improve network security.

BACKGROUND

Many networks storing web resources, such as web applications, web pages, or other content, include security management apparatus(es) that, among other functions, protect server devices storing the web resources from malicious attacks. One such set of attacks are denial of service (DoS) or distributed denial of service (DDoS) attacks, although many other types of malicious attacks exist including web-scraping and automated fraudulent bank transactions. Such attacks often originate from web or Internet robots, or applications that automatically generate malicious network traffic, commonly referred to herein as bots.

Attacks originating from bots can be mitigated by security management apparatuses by sending browser-level challenges prior to proxying network traffic to protected server devices. The browser-level challenges can include JavaScript code that must be executed client-side in order to return a result to the security management apparatus. If the result is verified, the security management apparatus can decide to allow the network traffic and, if the result is not sent or not verified, then the network traffic can be dropped or blocked, for example. Since many bots are not full web browsers with support for executing JavaScript, such challenges have been effective to reduce network attacks.

However, bots are increasingly sophisticated and run as emulated browsers or headless browsers that are lightweight and also capable of executing JavaScript and returning verifiable results. Accordingly, the challenge-result mechanism used by security management apparatus to detect bots and filter malicious network traffic is ineffective at mitigating network attacks originating with such smart bots that are capable of executing JavaScript.

SUMMARY

A method for detecting malicious smart bots to improve network security implemented by a network traffic management system comprising one or more security management apparatuses, client devices, or server devices, the method including sending a web page to one of the client devices in response to a request for a web resource received from the one of the client devices. The web page comprises injected capability analysis client-side code that is configured to obtain and return capability data for a web browser identified in a user agent header of the request. A response including the returned capability data is received from the one of the client devices. The returned capability data is compared with expected capability data for the web browser identified in the user agent header of the request. A score based at least in part on the comparison and a determination is made when the score exceeds an established threshold. The web resource is retrieved and provided to the one of the client devices, when the determination indicates that the score exceeds the established threshold.

A security management apparatus, comprising one or more comprising memory comprising programmed instructions stored thereon and one or more processors configured to be capable of executing the stored programmed instructions to send a web page to a client device in response to a request for a web resource received from the client device. The web page comprises injected capability analysis client-side code that is configured to obtain and return capability data for a web browser identified in a user agent header of the request. A response including the returned capability data is received from the client device. The returned capability data is compared with expected capability data for the web browser identified in the user agent header of the request. A score based at least in part on the comparison and a determination is made when the score exceeds an established threshold. The web resource is retrieved and provided to the client device, when the determination indicates that the score exceeds the established threshold.

A non-transitory computer readable medium having stored thereon instructions for detecting malicious smart bots to improve network security comprising executable code which when executed by one or more processors, causes the one or more processors to send a web page to a client device in response to a request for a web resource received from the client device. The web page comprises injected capability analysis client-side code that is configured to obtain and return capability data for a web browser identified in a user agent header of the request. A response including the returned capability data is received from the client device. The returned capability data is compared with expected capability data for the web browser identified in the user agent header of the request. A score based at least in part on the comparison and a determination is made when the score exceeds an established threshold. The web resource is retrieved and provided to the client device, when the determination indicates that the score exceeds the established threshold.

A network traffic management system, comprising one or more security management apparatuses, client devices, or server devices, the network traffic management system comprising memory comprising programmed instructions stored thereon and one or more processors configured to be capable of executing the stored programmed instructions to send a web page to a client device in response to a request for a web resource received from the client device. The web page comprises injected capability analysis client-side code that is configured to obtain and return capability data for a web browser identified in a user agent header of the request. A response including the returned capability data is received from the client device. The returned capability data is compared with expected capability data for the web browser identified in the user agent header of the request. A score based at least in part on the comparison and a determination is made when the score exceeds an established threshold. The web resource is retrieved and provided to the client device, when the determination indicates that the score exceeds the established threshold.

This technology has a number of associated advantages including providing methods, non-transitory computer readable media, security management apparatuses, and network traffic management systems that more effectively detect malicious smart bots to improve network security. With this technology, malicious bots can be identified even when the bots are capable of executing JavaScript code to respond to challenges. Accordingly, this technology improves network security and more effectively protects network resources by facilitating increased prevention of network attacks including denial of service attacks.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
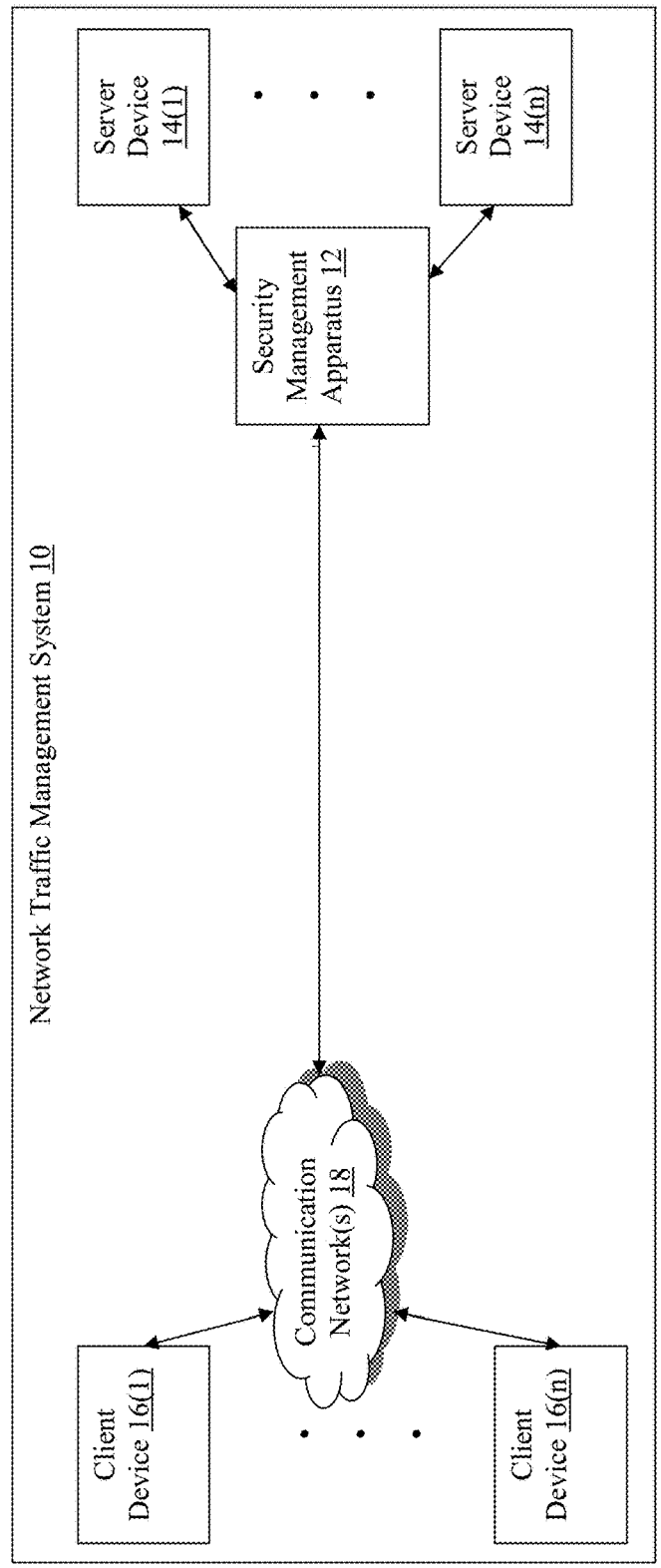
FIG. 1 is a block diagram of an exemplary network traffic management system with a security management apparatus.

Referring to FIG. 1, an exemplary network traffic management system 10, which incorporates an exemplary security management apparatus 12 is illustrated. The security management apparatus 12 in this example is coupled to a plurality of server devices 14(1)-14(n) and a plurality of client devices 16(1)-16(n) via communication network(s) 18, although the security management apparatus 12, server devices 14(1)-14(n), and client devices 16(1)-16(n) may be coupled together via other topologies. Additionally, the network traffic management system 10 may include other network devices such as one or more routers and/or switches, for example, which are well known in the art and thus will not be described herein. This technology provides a number of advantages including methods, non-transitory computer readable media, security management apparatuses, and network traffic management systems that improve network security by more effectively detecting, and preventing network traffic originating from, malicious smart bots.

Figure 2:
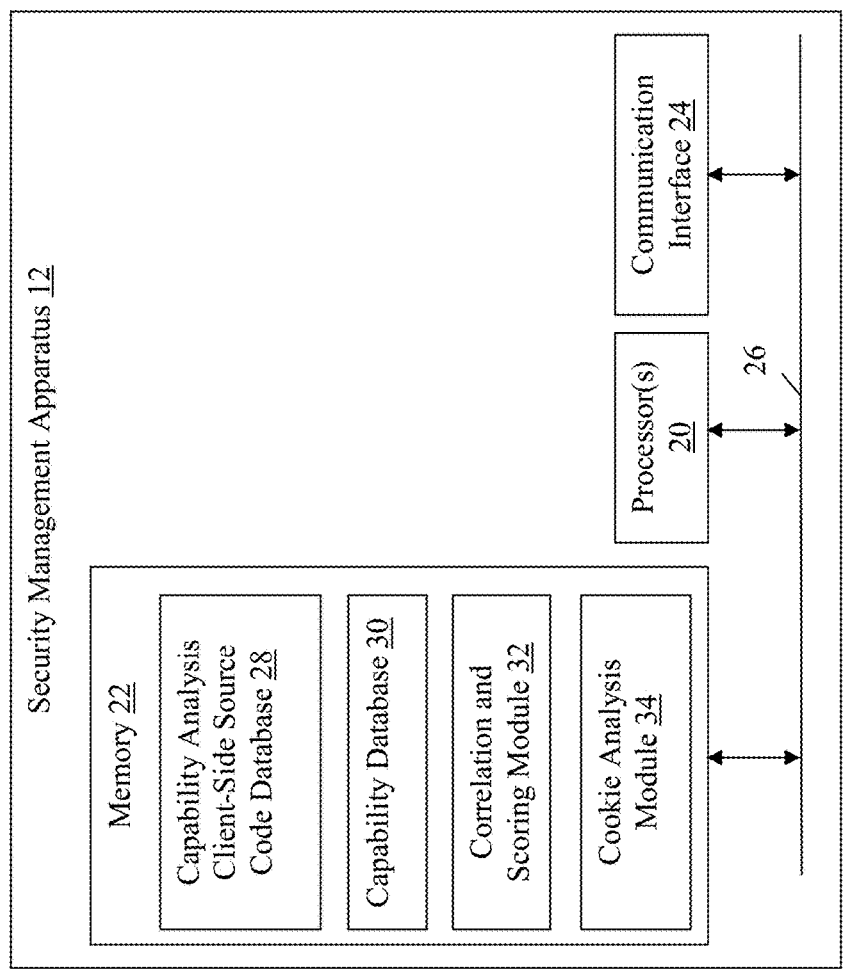
FIG. 2 is a block diagram of the exemplary security management apparatus shown in FIG. 1.

Referring to FIGS. 1-2, the security management apparatus 12 of the network traffic management system 10 may perform any number of functions including managing network traffic, load balancing network traffic across the server devices 14(1)-14(n), or accelerating network traffic associated with web applications hosted by the server devices 14(1)-14(n), in addition to providing security services and protecting the server devices 14(1)-14(n) from network attacks. The security management apparatus 12 in this example includes one or more processors 20, a memory 22, and a communication interface 24, which are coupled together by a bus 26 or other communication link, although the security management apparatus 12 can include other types and numbers of elements in other configurations.

The processor(s) 20 of the security management apparatus 12 may execute programmed instructions for the any number of the functions identified above. The processor(s) 20 may include one or more CPUs or general purpose processors with one or more processing cores, for example, although other types of processor(s) can also be used.

The memory 22 of the security management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Figure 3:
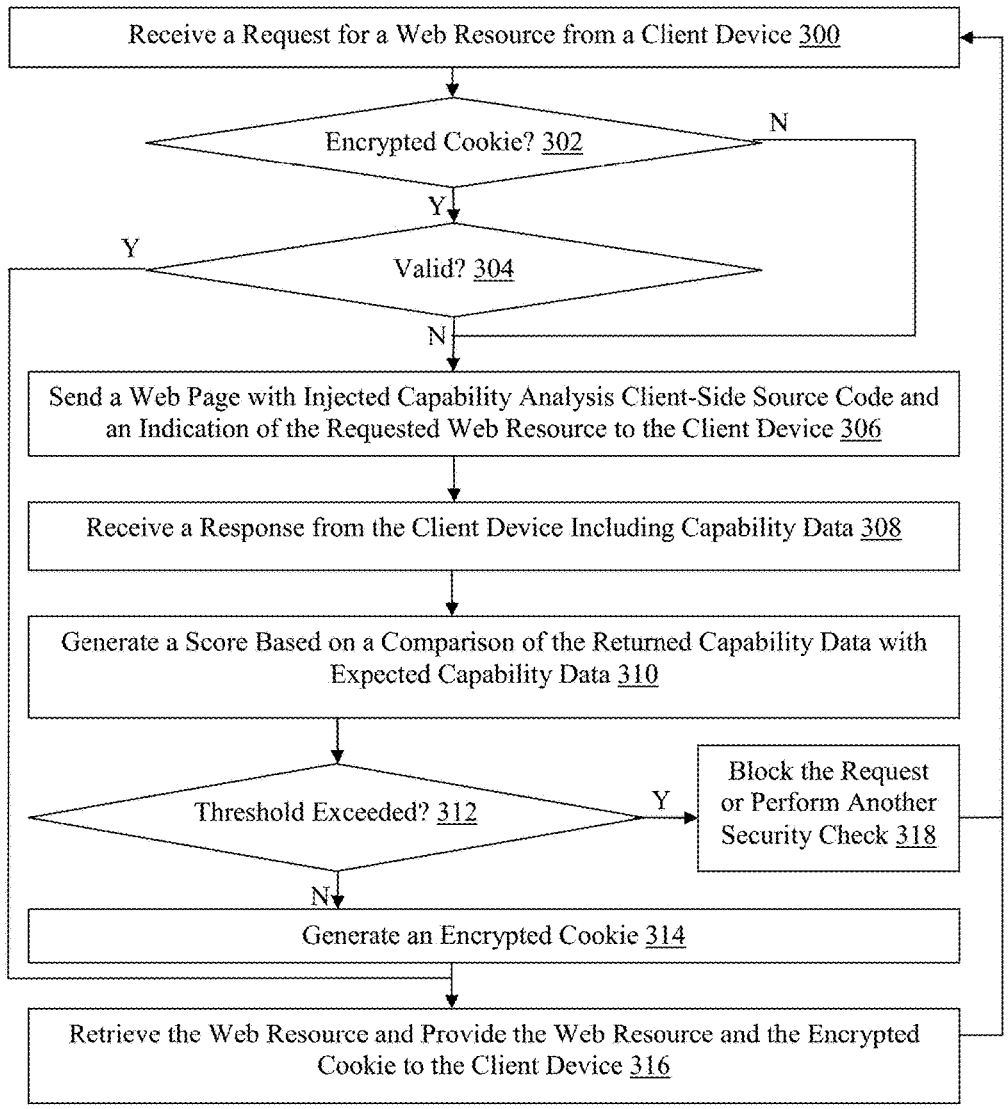
FIG. 3 is a flowchart of an exemplary method for detecting malicious smart bots.

Accordingly, the memory of the security management apparatus can store one or more applications that can include computer executable instructions that, when executed by the security management apparatus, cause the security management apparatus to perform actions, such as to transmit, receive, or otherwise process network traffic, for example, and to perform other actions described and illustrated below with reference to FIGS. 3-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the security management apparatus 12 itself, may be located in virtual server(s) running in a cloud-based computing environment rather than being tied to one or more specific physical network computing devices. Also, the application(s) may be running in one or more virtual machines (VMs) executing on the security management apparatus 12. Additionally, in one or more embodiments of this technology, virtual machine(s) running on the security management apparatus 12 may be managed or supervised by a hypervisor.

In this particular example, the memory 22 of the security management apparatus 12 includes a capability analysis client-side source code database 28 storing capability analysis client-side source code, a capabilities database 30, a correlation and scoring module 32, and a cookie analysis module 34, although the memory 22 can include other policies, modules, databases, or applications, for example. The capability analysis client-side source code database 28 stores capability analysis client-side source code, which can be text-based snippets of JavaScript code, for example, that can be injected into a web page generated by the security management apparatus 12 and sent to one of the client devices 16(1)-16(n). The capability analysis client-side source code is configured to obtain and return capability data for a web browser of the one of the client devices 16(1)-16(n). The capability data includes information about the web browser, such as whether certain APIs or HTML5 or CSS features are supported, for example.

Accordingly, the security management apparatus 12 can generate a web page, inject the capability analysis client-side source code into the web page, and send the web page to one of the client devices 16(1)-16(n). Subsequent to execution of the web page, and associated capability analysis client-side source code, by the web browser of the one of the client devices 16(1)-16(n), the security management apparatus 12 can receive the returned capability data. The capability data can be used by the security management apparatus 12 to determine whether the source of network traffic is a real browser or an emulated browser associated with a malicious smart bot, as described and illustrated in more detail later.

The capability database 30 in this example stores records of expected capability data for different types and/or versions of web browsers (e.g., based on user agent). The expected capability data includes an indication of the expected capabilities of the associated web browser. For example, the expected capability data may indicate that Internet Explorer 11 supports CSS zoom, pointer events, and the input method editor API, but does not support the gamepad API, vibration API, beacon API, push API, or CSS reflections. While the capability database 30 is illustrated in this example as stored within the memory 22 of the security management apparatus 12, the capability database 30 can be stored elsewhere, such as on a third party device coupled to the communication network(s) 18. Additionally, data stored on one or more third party devices can be retrieved and used to generate the capabilities database 30 stored in the memory 22 of the security management apparatus 12.

Accordingly, the security management apparatus 12 can compare the expected capability data stored in the capability database 30 to the returned capability data received from one of the client devices 16(1)-16(n) to determine whether the one of the client devices 16(1)-16(n) is likely a malicious smart bot. In the example described earlier, if the network traffic indicates that it originated from an Internet Explorer 11 web browser of the one of the client devices 16(1)-16(n), but the returned capability data indicates that the web browser of the one of the client devices 16(1)-16(n) does not support CSS zoom or pointer events, the security management apparatus 12 may determine that the network traffic originated with a malicious smart bot, as described and illustrated in more detail later.

The correlation and scoring module 32 in this example generates a score based on the strength of the correlation of returned capability data received from one of the client devices 16(1)-16(n) and expected capability data that is retrieved from the capability database 30 and compared to the returned capability data. The correlation and scoring module 32 can apply weights to various capabilities, and optionally utilize other information (e.g., header contents), to generate and output a score that indicates the likelihood that received network traffic originates from a malicious smart bot, also as described and illustrated in more detail later.

The cookie analysis module 34 in this example generates and analyzes encrypted cookies that can be used to determine whether received network traffic originated with a source that is not a malicious smart bot. Subsequent to determining that network traffic originated with a benign source, the cookie analysis module 34 generates an encrypted cookie, optionally using an IP address associated or fingerprint with the network traffic (e.g., to sign the cookie) and sends the encrypted cookie along with a requested network resource to one of the client devices 16(1)-16(n) from which the network traffic originated. Accordingly, the cookie analysis module 34 can then analyze the encrypted cookie in subsequent network traffic sent from the one of the client device 16(1)-16(n) to more efficiently determine whether the network traffic should be allowed, as described and illustrated in more detail later.

The communication interface 24 of the security management apparatus 12 in this example operatively couples and communicates between the security management apparatus 12, the server devices 14(1)-14(n), and/or the client devices 16(1)-16(n), which are all coupled together by the communication network(s) 18, although other types and numbers of communication networks or systems with other types and/or numbers of connections and configurations to other devices and/or elements can also be used.

By way of example only, the communication network(s) 18 can include local area network(s) (LAN(s)) and/or wide area network(s) (WAN(s)), and can use TCP/IP over Ethernet and industry-standard protocols, although other types and numbers of protocols and/or communication networks can be used. The communication network(s) 18 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) can also include direct connection(s) (e.g., for when a device illustrated in FIG. 1, such as the security management apparatus 18 or server devices 14(1)-14(n) operate as virtual instances on the same physical machine).

While the security management apparatus 12 is illustrated in this example as including a single device, the security management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the security management apparatus 12.

Additionally, one or more of the devices that together comprise the security management apparatus 12 in other examples can be standalone devices or integrated with one or more other devices or apparatuses, such as the server devices 14(1)-14(n), for example. Moreover, one or more of the devices of the security management apparatus 12 in these examples can be in a same or a different communication network including one or more public, private, or cloud networks, for example.

Each of the server devices 14(1)-14(n) of the network traffic management system 10 in this example includes one or more processors, a memory, and a communication interface, which are coupled together by a bus or other communication link, although other numbers and types of network devices could be used. The server devices 14(1)-14(n) process requests received from the client devices 16(1)-16(n) via the communication network(s) 18 according to the HTTP-based application RFC protocol, for example. Various applications may be operating on the server devices 14(1)-14(n) and transmitting data (e.g., files or Web pages) to the client devices 16(1)-16(n) via the security management apparatus 12 in response to requests from the client devices 16(1)-16(n). The server devices 14(1)-14(n) may be hardware or software or may represent a system with multiple servers in a pool, which may include internal or external networks.

Although the server devices 14(1)-14(n) are illustrated as single devices, one or more actions of each of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain a plurality of network computing devices that operate using a master/slave approach, whereby one of the network computing devices of the server devices 14(1)-14(n) operate to manage and/or otherwise coordinate operations of the other network computing devices. The server devices 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 14(1)-14(n) can operate within the security management apparatus 12 itself rather than as a stand-alone server device communicating with the security management apparatus 12 via the communication network(s) 18. In this example, the one or more server devices 14(1)-14(n) operate within the memory 22 of the security management apparatus 12.

The client devices 16(1)-16(n) of the network traffic management system 10 in this example include any type of computing device that can generate network traffic that appears to originate with a web browser, such as mobile computing devices, desktop computing devices, laptop computing devices, tablet computing devices, virtual machines (including cloud-based computers), or the like. Each of the client devices 16(1)-16(n) in this example includes a processor, a memory, and a communication interface, which are coupled together by a bus or other communication link, although other numbers and types of network devices could be used.

The client devices 16(1)-16(n) may run interface applications, such as standard Web browsers or standalone applications, which may provide an interface to make requests for, and receive resources stored on, one or more of the server devices 14(1)-14(n) via the communication network(s) 18. Such applications can include emulated or headless browsers (e.g., PhantomJS) that automatically generate malicious network traffic. The client devices 16(1)-16(n) may further include a display device, such as a display screen or touchscreen, and/or an input device, such as a keyboard for example.

Although the exemplary network traffic management system 10 with the security management apparatus 12, server devices 14(1)-14(n), client devices 16(1)-16(n), and communication network(s) 18 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the security management apparatus 12, client devices 16(1)-16(n), or server devices 14(1)-14(n), for example, may be configured to operate as virtual instances on the same physical machine. In other words, one or more of the security management apparatus 12, client devices 16(1)-16(n), or server devices 14(1)-14(n) may operate on the same physical device rather than as separate devices communicating through communication network(s). Additionally, there may be more or fewer security management apparatuses, client devices, or server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of detecting malicious smart bots to improve network security will now be described with reference to FIGS. 1-5. Referring more specifically to FIG. 3, in step 300 in this example, the security management apparatus 12 of the network traffic management system 10 receives a request for a web resource (e.g., a web page or other content) from one of the client devices 16(1)-16(n). The request includes a plurality of headers including a user agent header that indicates a web browser from which the request originated. The request also includes an indication (e.g., a URL) of the requested web resource.

Optionally, the request can be analyzed to determine whether the user agent indicates a web browser that is on a stored blacklist, which may indicate that the request originated from a malicious bot and should be blocked. Additionally, any number of other security checks can be implemented by the security management apparatus 12, such as prior to performing step 302, or subsequent to performing step 312 in this example.

In step 302, the security management apparatus 12 determines when the request includes an encrypted cookie. The encrypted cookie could have been generated by the security management apparatus 12 as described and illustrated in more detail later with reference to step 314, for example. The encrypted cookie can indicate that the security management apparatus 12 previously determined that the one of the client devices 16(1)-16(n) is likely benign and that network traffic originating from the one of the client devices 16(1)-16(n) should be allowed, although other approaches for providing this type of indication could be used. If the security management apparatus 12 determines that the request received in step 300 includes an encrypted cookie, then the Yes branch is taken to step 304.

In step 304, the cookie analysis module executing on the security management apparatus determines whether the encrypted cookie is valid. In some examples, the security management apparatus 12 uses an IP address included in the request or a fingerprint generated from the request to decrypt the encrypted cookie. The security management apparatus 12 can for example then determine whether the encrypted cookie is valid based on whether the decryption was successful, or based on an analysis of the decrypted value (e.g., a comparison against stored and known valid cookie values).

Additionally, the encrypted cookie can include an indication of an expiration time of the encrypted cookie and the security management apparatus 12 can also use the expiration time to determine whether the encrypted cookie is still valid. Other methods of encrypting the cookie or determining whether the encrypted cookie is valid can also be used. Accordingly, if the security management apparatus 12 determines in step 304 that the encrypted cookie is not valid and the No branch is taken, or if the security management apparatus 12 determines in step 302 that the request does not include an encrypted cookie and the No branch is taken, then the security management apparatus 12 proceeds to step 306.

In step 306, the security management apparatus 12 generates a web page, injects the capability analysis client-side source code from the capability analysis client-side source code database 28 into the web page, and sends the web page to the requesting one of the client devices 16(1)-16(n). The web page can be an otherwise generic web page with no visible content rendered when the web page is executed at the one of the client devices 16(1)-16(n), for example although other types of web pages could be used. Optionally, the capability analysis client-side source code can be JavaScript code that is obfuscated, but other types of capability analysis client-side source code can be used in other examples. Additionally, the indication of the requested web resource (e.g., URL) is maintained in this example, such as by inclusion in the web page, capability analysis client-side source code, or a cookie included when the web page is sent to the requesting one of the client devices 16(1)-16(n).

The capability analysis client-side source code is configured to, when executed by a web browser of the requesting one of the client devices 16(1)-16(n), query the web browser to obtain capability data, and return the capability data to the security management apparatus 12. The capability data includes information regarding the capabilities of the web browser, such as the supported APIs or features for example. Optionally, the capability analysis client-side source code can also be configured to, when executed by the web browser of the one of the client devices 16(1)-16(n), query other application(s) executing on the one of the client devices 16(1)-16(n) (e.g., an operating system) and the capability data can include information regarding the capabilities of those application(s).

Subsequently, in step 308, the security management apparatus 12 receives a response from the one of the client devices 16(1)-16(n) that includes returned capability data. Optionally, the capability analysis client-side source code can further be configured to, when executed by the web browser of the one of the client devices 16(1)-16(n), return the capability data to the security management apparatus 12 via a secure channel over the communication network(s) 18, for example.

In step 310, the correlation and scoring module 32 executing on the security management apparatus 12 compares the returned capability data with expected capability data and generates a score based on the comparison or level of match. The expected capability data can be stored in the capability database 30 and can include information regarding expected capabilities for different types of web browsers or web browser versions based on user agent, for example. The relevant expected capability data corresponds with a web browser and/or web browser version indicated in the user agent header of the response received in step 308, which is generally the same as indicated in the user agent header of the request received in step 300.

Figure 4:
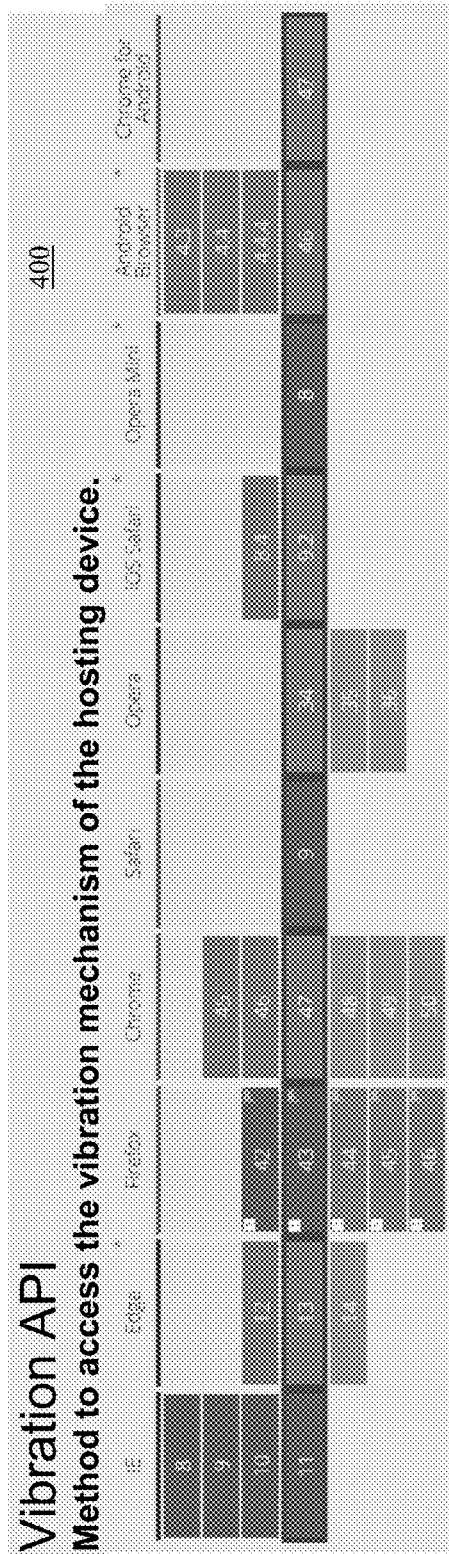
FIG. 4 is a table of exemplary expected capability data for the vibration JavaScript API capability.

Referring more specifically to FIG. 4, a table 400 of exemplary expected capability data for the vibration JavaScript API capability is illustrated. In this example, the red color indicates that the associated version of the associated web browser does not support the vibration API and the green color indicates that the associated version of the associated web browser does support the vibration API. Accordingly, versions 8-11 of the Internet Explorer (IE) web browser do not support the vibration API and versions 45-50 of the Chrome web browser do support the vibration API. Corresponding information illustrated in FIG. 4 can be encapsulated as expected capability data stored in the capability database 32 for any other types and number of capabilities and the expected capability data can have other types of values or formats in other examples.

Referring back to FIG. 3, the generated score can be based, in one example, on a number or percentage of matches between the returned capability data and the expected capability data. As one example, if the request received in step 300, and the response received in step 308, include a user agent header indicating a Chrome version 50 web browser, but the returned capability data indicates that the vibration API is not supported, then the generated score can reflect the mismatch. In this example, the score reflects a likelihood that the network traffic has originated from a malicious smart bot that is not, but is emulating or advertising itself as being, a Chrome version 50 web browser.

In another example, the generated score can be based on a weight associated with one or more portions of the returned or expected capabilities data. The one or more portions correspond in this example to one or more capabilities and the weights can be based on a likelihood that one of the capabilities is associated with a malicious smart bot. For example, the capabilities of WebGL or Flash support are relatively strong indicators of a headless browser that is acting as a malicious bot. Accordingly, if the expected capability data indicates that the web browser identified in the user agent header supports WebGL or Flash, but the returned capability data indicates no support for WebGL and/or Flash, the generated score can reflect additional weighting for the lack of correlation of those capabilities.

In yet other examples, one or more header values can also be used to generate the score in step 310. For example, a header indicating that the response in step 308 was sent via a proxy network device may weigh in favor of the response originating from a malicious smart bot. In another example, fingerprinting via HTTP request header(s), a referrer header versus the history length, the browser user agent as compared to the HTTP user agent, detection of any manipulation of the web page sent in step 306, reputation of an IP address of the one of the client devices 16(1)-16(n), or Selenium WebDriver TCP port detection can also be used to generate the score. In yet another example, the returned capability data must match exactly the expected capability data, and the score merely indicates whether there was an exact match. Other types and numbers of headers and values, and any other information, can also be used to generate the score in step 310.

In step 312, the security management apparatus 12 determines when the score generated in step 310 exceeds a threshold based on being above or below the threshold depending on how the score is generated. Exceeding the threshold in this example indicates that the request was likely received in step 300 from a malicious smart bot. The threshold can be established by an administrator via a provided administrator interface and stored in the memory 22 of the security management apparatus 12, for example, although the threshold can also be established and/or stored in other ways. If the security management apparatus 12 determines that the threshold is not exceeded, then the No branch is taken to step 314.

In step 314, the security management apparatus 12 generates an encrypted cookie. The cookie can be signed with the IP address of the one of the client devices 16(1)-16(n) and any portion of a fingerprint of the one of the client devices 16(1)-16(n) can be used to encrypt the cookie. Optionally, the encrypted cookie can include an expiration time beyond which the encrypted cookie will no longer be considered valid by the security management apparatus 12. Accordingly, the encrypted cookie allows the one of the client devices 16(1)-16(n) to continue communicating with the security management apparatus 12 (and protected server devices 14(1)-14(n)) without requiring that that security management apparatus 12 repeat steps 304-312.

Subsequent to generating the encrypted cookie in step 314, or if the security management apparatus 12 determines in step 304 that the encrypted cookie included in the request received in step 300 is valid and the Yes branch is taken, the security management apparatus 12 proceeds to step 316. In step 316, the security management apparatus 12 retrieves the web resource requested in step 300 from one of the server devices 14(1)-14(n) and provides the web resource and the encrypted cookie to the one of the client devices 16(1)-16(n).

In this example, the security management apparatus 12 can retrieve the indication of the web resource (e.g., a URL) from a cookie or other portion of the response received in step 308. By communicating the indication of the web resource back to the one of the client devices 16(1)-16(n) with the web page in step 306, and receiving the indication of the web resource with the response in step 308, the security management apparatus 12 does not have to store the indication of the web resource locally.

Referring back to step 312, if the security management apparatus 12 determines that the score generated in step 310 does exceed the threshold, then the No branch is taken to step 318. In step 318, the security management apparatus 12 effectively drops, blocks, or ignores the request and does not retrieve the requested web resource or provide it to the one of the client devices 16(1)-16(n). Alternatively, the security management apparatus 12 can perform another security check associated with another layer of a security policy, for example, in order to further confirm the determination that the one of the client devices 16(1)-16(n) is likely a malicious smart bot. Optionally, the security management apparatus 12 can also store an indication of the one of the client devices 16(1)-16(n) (e.g., an IP address) in a blacklist.

Figure 5:
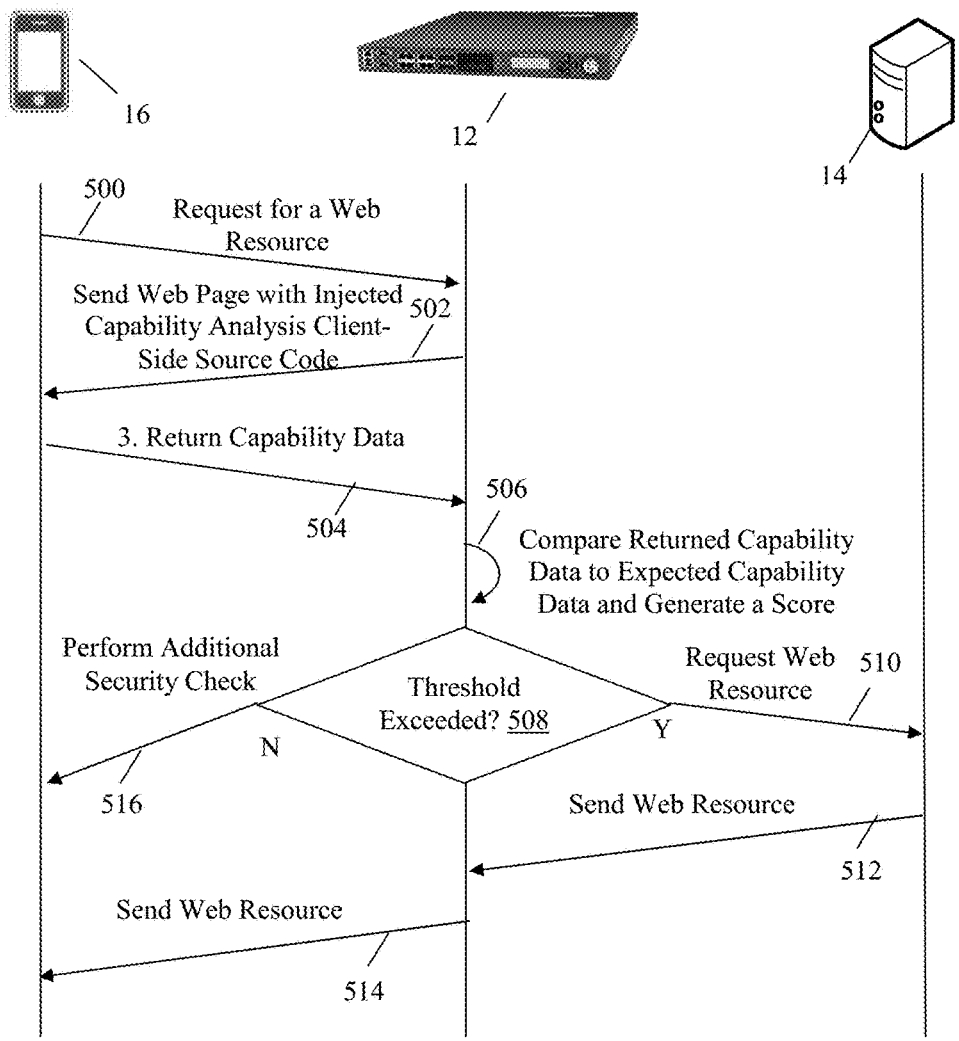
FIG. 5 is a timing diagram illustrating an exemplary method for detecting malicious smart bots.

Referring more specifically to FIG. 5, a timing diagram of a method of detecting malicious smart bots to improve network security is illustrated. In step 500 in this example, the client device 16 sends a request for a web resource (e.g., a web page) to the security management apparatus 12. The request includes an indication of the web resource (e.g., a URL). Optionally, the security management apparatus 12 confirms that a user agent header does not correspond to a known malicious bot, attempts to validate an encrypted cookie included with the request, or performs one or more other security checks with respect to the request.

In step 502, the security management apparatus 12 sends a web page with injected capability analysis client-side source code (e.g., JavaScript code). The web page can be a generic or blank web page generated by the security management apparatus 12 in order to communicate, and cause a web browser of the client device 16 to execute, the capability analysis client-side source code. The capability analysis client-side source code is configured to obtain and return capability data including information regarding the capabilities of at least the web browser from which the request in step 500 originated. Optionally, the security management apparatus 12 includes an indication of the web resource in a cookie sent along with the web page.

Accordingly, in step 504, the web browser of the client device 16 executes the capability analysis client-side source code and returns the capability data. If the security management apparatus 12 does not receive the capability data, then the client device 16 could not execute the capability analysis client-side source code, which may indicate that the client device 16 is a malicious bot. However, if the security management apparatus 12 does receive the capability data, in step 506, the security management apparatus 12 compares the returned capability data to expected capability data, and generates a score based on the comparison.

The expected capability data can include information regarding the capabilities of a web browser identified in a user agent header of the response sent with the returned capability data in step 504. The generated score can be based on the strength of the correlation between the returned capability data and the expected capability data, for example, and various capabilities can be weighted differently based on the likelihood that the capabilities are associated with a malicious smart bot. Accordingly, the score is indicative of how likely the web browser originating the network traffic is a real web browser that corresponds to the web browser advertised in the user agent header of the network traffic.

In step 508, the security management apparatus 12 determines whether a threshold score is exceeded by the score generated in step 508. If the security management apparatus 12 determines that the threshold is exceeded, then the Yes branch is taken and the security management apparatus 12 sends a request for the web resource to the server device 14 in step 510. The web resource can be identified based on the indication (e.g., URL) included in a cookie received from the client device 16 along with the returned capability data, for example.

In step 512, the server device 14 sends the requested web resource to the security management apparatus 12. In step 514, the security management apparatus 12 sends the web resource to the client device 16. Optionally, the security management apparatus 12 generates an encrypted cookie that is sent to the client device 16 along with the web resource and used to indicate that subsequent network traffic received by the security management apparatus 12 from the client device 16 is not malicious.

Referring back to step 508, if the security management apparatus 12 determines that the threshold score is not exceeded, then the No branch is taken to step 516. In step 516, the security management apparatus 12 performs an additional security check on the client device 16 in this example, although the security management apparatus 12 could also ignore the request or perform another action.

With this technology, malicious bots that emulate real web browsers are more effectively detected, thereby improving network security. This technology facilitates detection of malicious bots even if the bots are smart bots capable of executing JavaScript code to satisfy challenges. Accordingly, denial of service and other network attacks can be mitigated more effectively with this technology, and server and other network devices or resources can be better protected.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for detecting malicious smart bots to improve network security implemented by a network traffic management system comprising one or more security management apparatuses, server devices, or client devices, the method comprising:

sending a web page to a client in response to a request for a web resource received from the client, wherein the web page comprises injected capability analysis client-side code that is configured to obtain and return capability data for a web browser identified in a user agent header of the request;

receiving a response from the client, the response comprising the returned capability data, and comparing capabilities of the web browser indicated in the returned capability data with stored expected capabilities of the web browser;

generating a score based at least in part on the comparison and determining when the score exceeds an established threshold; and retrieving the web resource and providing the web resource to the client, when the determining indicates that the score exceeds the established threshold.

2. The method of claim 1, further comprising blocking the request or performing a security check on the client, when the determining indicates that the score does not exceed the established threshold.

3. The method of claim 1, further comprising:

determining when the request comprises an encrypted cookie and, when the determining indicates that the request comprises the encrypted cookie, determining when the encrypted cookie is valid;

retrieving and providing the web resource to the client without sending the web page to the client, receiving the response, generating the score, or determining when the score exceeds the established threshold, when the determining indicates that the encrypted cookie is valid; and generating the encrypted cookie and providing the encrypted cookie to the client along with the web resource, when the determining indicates that the request does not comprise the encrypted cookie.

4. The method of claim 1, wherein the score is generated based on a number or weight of matches between the capabilities of the web browser indicated in the returned capability data and the stored expected capabilities and the weight is based on a likelihood that one of the capabilities is associated with a malicious smart bot.

5. The method of claim 1, further comprising sending an indication of the web resource along with the web page to the client, wherein the response further comprises the indication of the web resource and the web resource is retrieved using the indication of the web resource included in the response.

6. A security management apparatus, comprising memory comprising programmed instructions stored thereon and one or more processors configured to be capable of executing the stored programmed instructions to:

send a web page to a client in response to a request for a web resource received from the client, wherein the web page comprises injected capability analysis client-side code that is configured to obtain and return capability data for a web browser identified in a user agent header of the request;

receive a response from the client, the response comprising the returned capability data, and comparing capabilities of the web browser indicated in the returned capability data with stored expected capabilities of the web browser;

generate a score based at least in part on the comparison and determine when the score exceeds an established threshold; and retrieve the web resource and provide the web resource to the client, when the determining indicates that the score exceeds the established threshold.

7. The security management apparatus of claim 6, wherein the one or more processors are further configured to be capable of executing the stored programmed instructions to block the request or perform a security check on the client, when the determining indicates that the score does not exceed the established threshold.

8. The security management apparatus of claim 6, wherein the one or more processors are further configured to be capable of executing the stored programmed instructions to:

determine when the request comprises an encrypted cookie and, when the determining indicates that the request comprises the encrypted cookie, determine when the encrypted cookie valid;

retrieve and provide the web resource to the client without sending the web page to the client, receiving the response, generating the score, or determining when the score exceeds the established threshold, when the determining indicates that the encrypted cookie is valid; and generate the encrypted cookie and provide the encrypted cookie to the client along with the web resource, when the determining indicates that the request does not comprise the encrypted cookie.

9. The security management apparatus of claim 6, wherein the score is generated based on a number or weight of matches between the capabilities of the web browser indicated in the returned capability data and the stored expected capabilities and the weight is based on a likelihood that one of the capabilities is associated with a malicious smart bot.

10. The security management apparatus of claim 6, wherein the one or more processors are further configured to be capable of executing the stored programmed instructions to send an indication of the web resource along with the web page to the client, wherein the response further comprises the indication of the web resource and the web resource is retrieved using the indication of the web resource included in the response.

11. A non-transitory computer readable medium having stored thereon instructions for detecting malicious smart bots to improve network security comprising executable code which when executed by one or more processors, causes the processors to:

send a web page to a client in response to a request for a web resource received from the client, wherein the web page comprises injected capability analysis client-side code that is configured to obtain and return capability data for a web browser identified in a user agent header of the request;

receive a response from the client, the response comprising the returned capability data, and comparing capabilities of the web browser indicated in the returned capability data with stored expected capabilities of the web browser;

generate a score based at least in part on the comparison and determine when the score exceeds an established threshold; and retrieve the web resource and provide the web resource to the client, when the determining indicates that the score exceeds the established threshold.

12. The non-transitory computer readable medium of claim 11, wherein the executable code, when executed by the one or more processors, further causes the one or more processors to block the request or perform a security check on the client, when the determining indicates that the score does not exceed the established threshold.

13. The non-transitory computer readable medium of claim 11, wherein the executable code, when executed by the one or more processors, further causes the one or more processors to:
determine when the request comprises an encrypted cookie and, when the determining indicates that the request comprises the encrypted cookie, determine when the encrypted cookie valid;
retrieve and provide the web resource to the client without sending the web page to the client, receiving the response, generating the score, or determining when the score exceeds the established threshold, when the determining indicates that the encrypted cookie is valid; and
generate the encrypted cookie and provide the encrypted cookie to the client along with the web resource, when the determining indicates that the request does not comprise the encrypted cookie.

14. The non-transitory computer readable medium of claim 11, wherein the score is generated based on a number or weight of matches between the capabilities of the web browser indicated in the returned capability data and the stored expected capabilities and the weight is based on a likelihood that one of the capabilities is associated with a malicious smart bot.

15. The non-transitory computer readable medium of claim 11, wherein the executable code, when executed by the one or more processors, further causes the one or more processors to send an indication of the web resource along with the web page to the client, wherein the response further comprises the indication of the web resource and the web resource is retrieved using the indication of the web resource included in the response.

16. A network traffic management system, comprising one or more security management apparatuses, client, or server devices, the network traffic management system comprising memory comprising programmed instructions stored thereon and one or more processors configured to be capable of executing the stored programmed instructions to:
send a web page to a client in response to a request for a web resource received from the client, wherein the web page comprises injected capability analysis client-side code that is configured to obtain and return capability data for a web browser identified in a user agent header of the request;
receive a response from the client, the response comprising the returned capability data, and comparing capabilities of the web browser indicated in the returned capability data with stored expected capabilities of the web browser;
generate a score based at least in part on the comparison and determine when the score exceeds an established threshold; and
retrieve the web resource and provide the web resource to the client, when the determining indicates that the score exceeds the established threshold.

17. The network traffic management system of claim 16, wherein the one or more processors are further configured to be capable of executing the stored programmed instructions to block the request or perform a security check on the client, when the determining indicates that the score does not exceed the established threshold.

18. The network traffic management system of claim 16, wherein the one or more processors are further configured to be capable of executing the stored programmed instructions to:
determine when the request comprises an encrypted cookie and, when the determining indicates that the request comprises the encrypted cookie, determine when the encrypted cookie valid;
retrieve and provide the web resource to the client without sending the web page to the client, receiving the response, generating the score, or determining when the score exceeds the established threshold, when the determining indicates that the encrypted cookie is valid; and
generate the encrypted cookie and provide the encrypted cookie to the client along with the web resource, when the determining indicates that the request does not comprise the encrypted cookie.

19. The network traffic management system of claim 16, wherein the score is generated based on a number or weight of matches between the capabilities of the web browser indicated in the returned capability data and the stored expected capabilities and the weight is based on a likelihood that one of the capabilities is associated with a malicious smart bot.

20. The network traffic management system of claim 16, wherein the one or more processors are further configured to be capable of executing the stored programmed instructions to send an indication of the web resource along with the web page to the client, wherein the response further comprises the indication of the web resource and the web resource is retrieved using the indication of the web resource included in the response.

* * * * *